(Model.)
A. H. AIKMAN & G. K. OSBORN.
Hydraulic Air Pump.
No. 237,153. Patented Feb. 1, 1881.
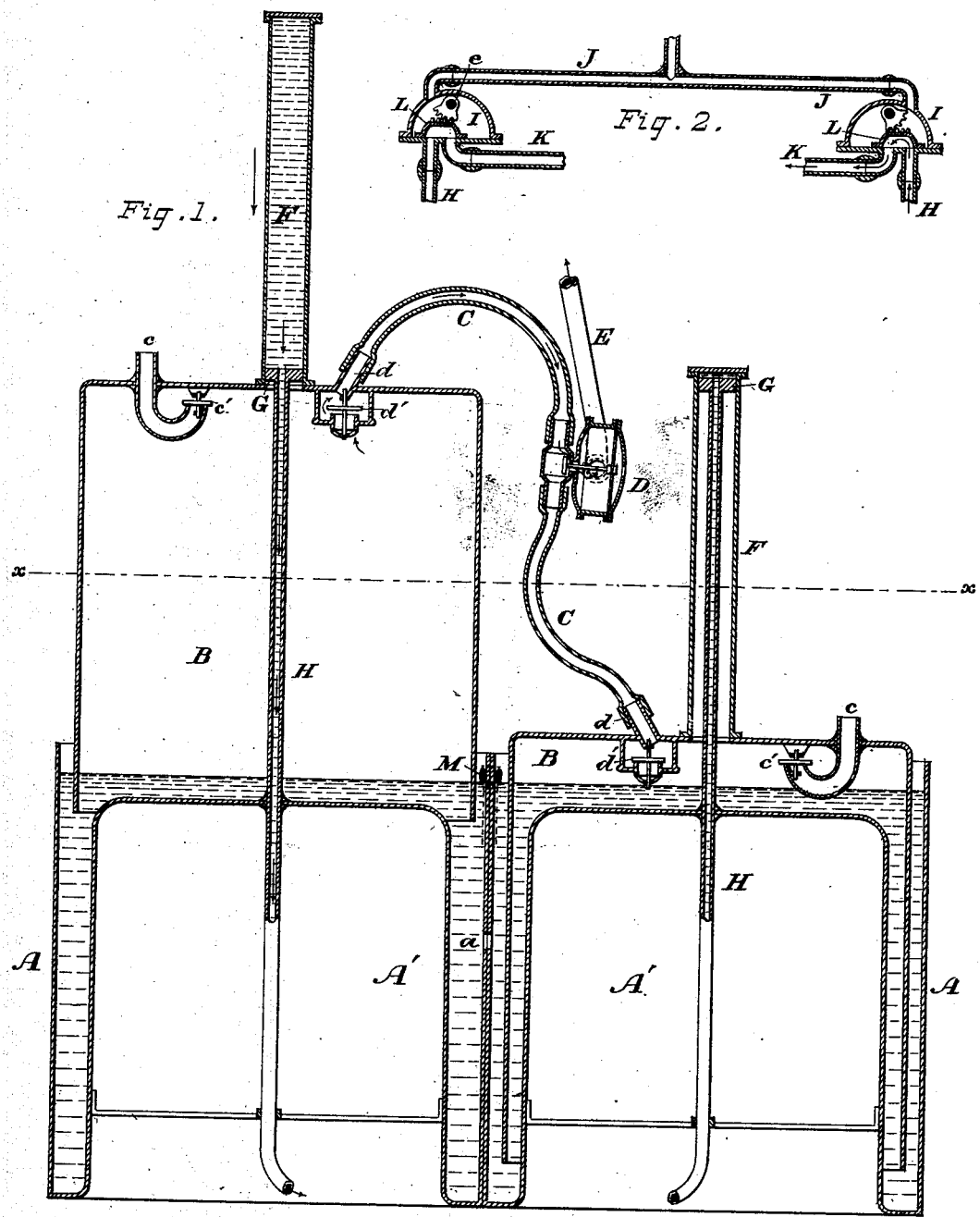
ATTEST:
Arthur C. Fraser.
Joseph Goodrich
INVENTORS:
Augustus H. Aikman &
George K. Osborn,
By their Attorneys:
Burke, Fraser & Connett

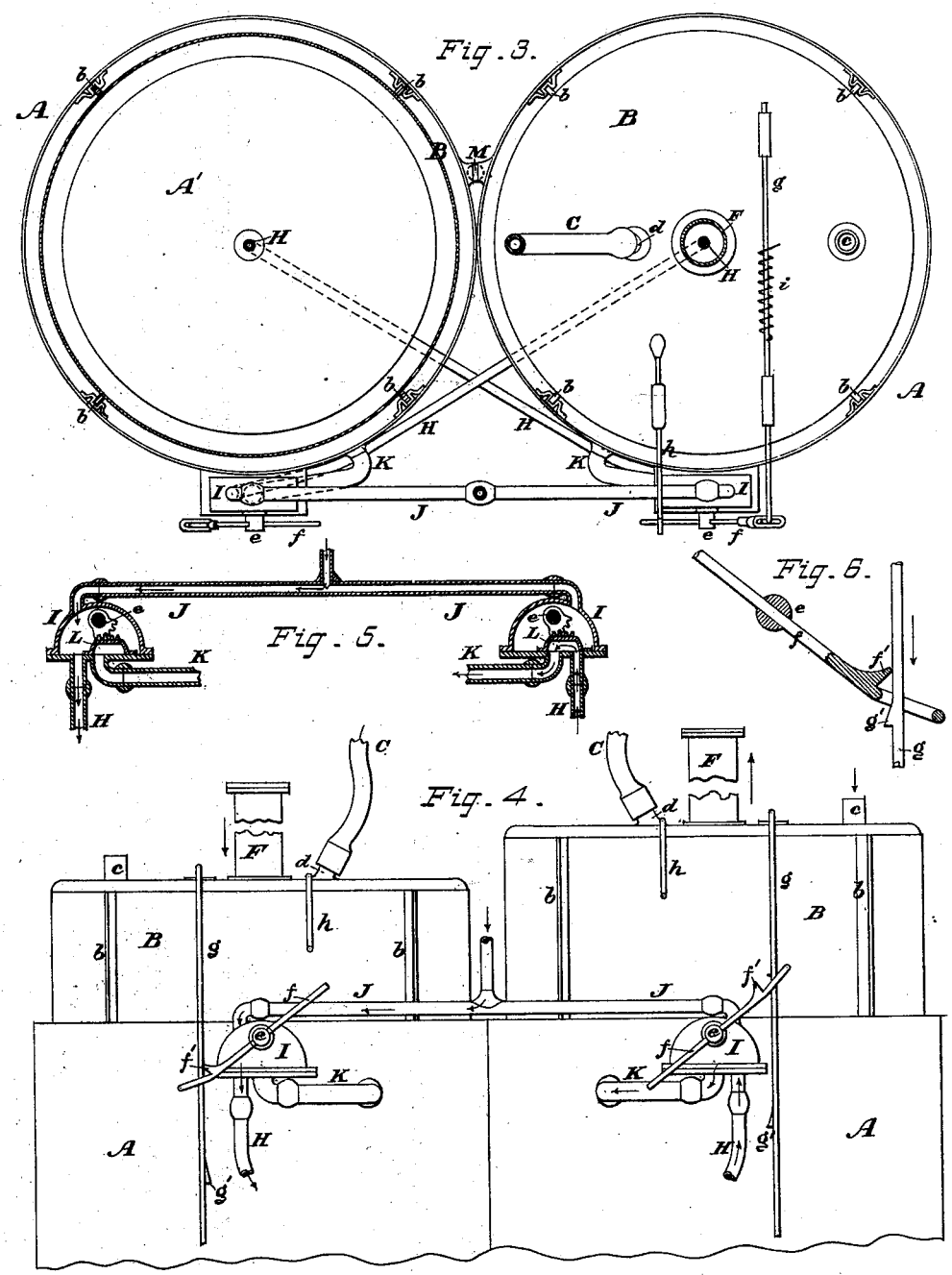

UNITED STATES PATENT OFFICE.

AUGUSTUS H. AIKMAN AND GEORGE K. OSBORN, OF BROOKLYN, ASSIGNORS TO UNITED STATES KEROSENE GASLIGHT COMPANY, OF NEW YORK, N. Y.

HYDRAULIC AIR-PUMP.

SPECIFICATION forming part of Letters Patent No. 237,153, dated February 1, 1881.

Application filed July 12, 1880. (Model.)

To all whom it may concern:

Be it known that we, AUGUSTUS H. AIKMAN and GEORGE K. OSBORN, both of Brooklyn, in the county of Kings and State of New York, have jointly invented certain Improvements in Hydraulic Air-Pumps, of which the following is a specification, reference being had to the accompanying drawings, in which—

Figure 1 is a vertical mid-section, showing one air bell or cylinder of the pump at the bottom of its stroke and the other just commencing its descent. Fig. 2 is a detached section of the valves, showing their arrangement when the cylinders are in this position. Fig. 3 is a horizontal section taken in the plane of the line $x$ $x$ in Fig. 1. Fig. 4 is a front elevation, showing the left-hand cylinder descending and the right-hand one rising, as indicated by the arrows. Fig. 5 is a sectional view of the valves when the cylinders are in the position shown in Fig. 4. Fig. 6 is an enlarged detached view of a valve-lever, showing the method of disengaging the actuating-rod.

Let A A represent stationary tanks for holding water, preferably of cylindrical form, and placed side by side, with a tube or opening, $a$, connecting them, that the water may assume the same level in both. Inside of each tank may be arranged a hollow cylinder, A', closed at the top, and so joined to the tank at the bottom as to form a part of the same, thereby leaving an annular water-space between the walls of the tank and inner vessel. By this construction all the advantage of a large and full tank of water is secured with but a small proportion of the weight of such tank when filled.

B B are air bells or cylinders having open bottoms and preferably straight vertical sides. These are of such shape and size as to enter the annular water-spaces in the tanks A A. Said air-bells are arranged to reciprocate vertically in the tanks, being steadied in their movement by some suitable guides, as $b$ $b$, and the tanks are filled with sufficient water to keep the lower edges of the bells completely submerged during their operation. Each air-bell is provided with an air-inlet pipe, $c$, having a suitable check-valve, $c'$, opening inwardly, and with on air-outlet, $d$, having a suitable valve, $d'$, opening outwardly. These valves $c'$ and $d'$ consist each of a thin plate or disk resting on the upturned mouth of a tube and fixed to a straight central stem, which is suitably guided. A rubber ring may be interposed between the disk and the mouth of the tube, to secure an air-tight joint, or the parts may be made to simply fit closely together.

To each outlet-pipe $d$ is attached the end of a flexible tube, C, the other end of which is connected with the supply or inlet opening of a diaphragm pressure-regulator, D, as shown in Fig. 1. This regulator may be of any ordinary construction, that shown being well adapted to the purpose, as it must be interposed between the air-exit tubes C C and the final delivery-tube E, to maintain a uniform pressure beyond that point.

At the top of each air-bell, and preferably concentric with it is secured a vertical water-cylinder, F, having a closed top and open bottom. Within this cylinder is a stationary piston, G, mounted on a fixed pipe or tubular upright, H, which is arranged vertically in and is suitably supported by the tank A or its interior portion, A', all as best shown in Fig. 1. This pipe H extends down to or near the bottom of the tank A, passes through or under the same, as indicated in Fig. 3, and extends to and is connected with a valve-chest, I, on the other tank. Each valve-chest I has a water-supply pipe, J, and also an exhaust or discharge pipe, K, connected with it, and incloses a sliding D-valve, L, as shown in the sectional views, Figs. 2 and 5. The valve L is operated by an oscillating shaft or valve-stem, $e$, preferably through a toothed sector fixed to the stem, which meshes with gear-teeth or projections on the valve, or they may be connected in any other operative way. Outside of the valve-chest the stem $e$ is fixed to a rocking arm, $f$, shown in Figs. 3 and 4, which is actuated by depressors $g$ and $h$ attached to or depending from the air-bells B. The depressor $g$ acts upon and pushes down its end of the arm $f$ shortly after the air-bell commences its descent, and the depressor $h$ acts upon and presses down the opposite end of the arm just as the air-bell is completing its descent. The former depressor consists of a pendent rod preferably pivoted to the air-bell at the top, and arranged to be pressed toward the fulcrum of the arm $f$ by a spring, $i$. It works in an eye at the end of the arm $f$, and has a toe, $g'$, which engages the inner edge of the eye, and carries that end of the arm down with it. When the arm has reached the limit of its vibration the toe $g'$ is disengaged by means of a projection, $f'$ from the arm $f$, which pushes it off clear of the edge of the eye, as shown in Fig. 6. The depressor $h$ is simply a projection fixed to the air-bell, and extended down the requisite distance to operate the arm at the proper time. The operative parts of the depressors $g$ and $h$ may be adjustable vertically, if desired.

The exhaust or discharge pipes K K may lead to a waste or sewer pipe, or may, as shown, connect with the tanks A A, in which case the tanks, or one of them, will be provided with an overflow-pipe, M, leading to the sewer. This arrangement preserves a uniform water-level in the tanks.

The operation of our improved air-pump is as follows, commencing with the position shown in Figs. 1 and 2: Water under pressure is admitted at the supply-pipe J, but its entrance into the pipes H H is prevented by the position of the valves L L, both being turned to the exhaust. The left-hand cylinder F is descending, and its contained water is flowing out through the pipe H into the right-hand valve I L, and through the exhaust K into the tank A. When the left-hand cylinder has descended one-quarter of the way, or to some other predetermined point, the depressor-rod $g$ presses down the left end of the rod $f$, rotating the valve-stem $e$, and moving the valve L to the right, thus uncovering the inlet-port and admitting water through the pipe H to the right-hand cylinder F, which at once commences to rise. The descent of the left-hand cylinder continuing, the rod $g$, when it has fully opened the left-hand valve I L, is disengaged by the projection $f'$, as before described. The cylinders have now the relative positions and motions indicated in Fig. 4. Ordinarily the rising cylinder will ascend somewhat rapidly, not stopping until it reaches the limit of its stroke, where it will stand until the descending cylinder reverses its valve. This reversal is commenced shortly before and completed when the descending cylinder reaches the bottom of its stroke, or it may be prearranged to be effected at some other point, if preferred. The depressor $h$ on the left-hand or descending cylinder engages the right-hand end of the arm $f$, which operates the left-hand valve and depresses that end of said arm, thus moving the valve L to the left, first closing the port of the pipe H, and then bringing it into communication with the port of the pipe K, whereby the water from the right-hand cylinder is permitted to flow down to the left and up through the pipe H, and thence, through the pipe K, into the left-hand tank A. The right-hand cylinder then begins its descent, and the left-hand cylinder, having reached the bottom of its stroke, rests. Each cylinder has now assumed the position occupied by the other at the commencement of the operation, which is shown in Fig. 1.

The movements described are repeated in their order continuously and indefinitely during the operation of the machine.

As each cylinder F, with its attached air-bell, ascends, a partial vacuum is formed within the air-bell, causing the outer air to enter at $c$, lifting the disk-valve $c'$, so that when the bell reaches the top of its stroke it is filled with air. The valve $c'$ then closes, and when the air-bell commences its descent its weight compresses the air within it, which, lifting the valve $d'$, escapes through the outlet $d$ into the tube C, and passes through the pressure-regulator D into the delivery-tube E. Should the pressure of air become too great in the latter tube the regulator D will at once wholly or partially cut off the admission of air from the tube C, thus confining the compressed air to the air-bells, where, when its tension becomes equal to the weight of the descending parts, it stops their descent, and they will remain stationary, upheld by the cushion of air until such time as more air is permitted to escape, when their descent is recommenced. The speed of the descending air-bells is governed entirely by the escape of air from them, so that when the machine is properly adjusted the supply of air is always sufficient to meet the demand for it, however inconstant that demand may be. As the pressure upon the air is caused entirely by the weight of the air-bell and the parts it supports, this weight must be made sufficient to compress the air to the desired density.

It will be seen from the foregoing description that the movements of each cylinder are controlled entirely by the other, but that in their movements the bells and cylinders are entirely independent, moving up as rapidly as the hydraulic pressure will permit, and descending only as the air is required for use, slowly, rapidly, or intermittently. When the air-delivery pipe is closed by turning the cock the pump stops. This forms the most essential feature of our invention, by which we are enabled to produce an automatic or self-regulating pump, which shall be double acting, and thereby produce an uninterrupted current of air.

The advantages of some portions of our invention may be made available without the rest—as, for instance, a different method of operating the valves may be used, or our method of operating them may be used with a single-acting cylinder.

If preferred, vertical pipes, entering the air-bells from the bottom and opening inside them above the surface of the water, may be used in place of the flexible tubes C C.

In lieu of two tanks, A A, one larger oblong tank may be used, if preferred, and the parts A' may be omitted. These latter are not in any degree essential to the operation of the pump, but serve to lighten the tank.

In lieu of mounting the cylinder F on the top of the air-bell it might be arranged within it, either wholly or partially, as found most convenient. In such a case the cylinder might be attached to the roof of the bell, as in the drawings.

Instead of the piston G attached to the supply-pipe H, as shown, the piston may be entirely dispensed with and the pipe H be arranged to telescope with the cylinder either inside or out. In such a case a suitable packing would be required to prevent leakage between the cylinder and pipe.

We claim—

1. In an air-pump, the independently-operating air-bells B B, arranged to play up and down in a sealing liquid and provided with valved air inlets and outlets, and valves L L, each bell being arranged to shift, in its descent, the valve of the other bell, substantially as shown and described.

2. In an air-pump actuated by hydraulic power, the air-bells B B, arranged to rise and fall independently of each other, and provided with engines and valves substantially as shown, so arranged that each bell shall actuate the valve of the other in its descent, the descending bell acting, by gravity alone, as a distributing-reservoir, as specified.

3. In an air-pump, the alternately-moving air-bells B B, provided with suitably-valved air inlets and outlets, the tubes C C, the pressure-regulator D, and the delivery-tube E, all combined and arranged to operate substantially as and for the purposes set forth.

4. The independently-operating air-bells B B, in combination with the hydraulic engines for lifting them, the valves L L, the pipes H H, arranged to connect the engines with the valves, and a suitable valve-shifting mechanism connected with the bells, whereby the bell in its descent shall first open and then close the inlet-port of the valve connected with the other bell, substantially as and for the purposes herein set forth.

5. In an air-pump, the combination of the air-bell B, the hydraulic cylinder F connected therewith, the fixed piston G, and the hollow or tubular upright H, connected with a supply and exhaust pipe through the medium of a shifting-valve, when the said bell is provided with suitably-valved air inlets and outlets, and arranged to play up and down in a sealing liquid, substantially as set forth.

6. In an air-pump, the combination of an air-bell, B, adapted to be forcibly raised, so as to take in air and to serve in its descent as a gravity delivery-reservoir, provided with suitably-valved air inlets and outlets, and arranged to play up and down in a sealing liquid, the hydraulic-engine for lifting the bell, the pipe H, to supply the engine with water, the slide-valve L, the valve-chest I, supply and waste pipes J K, and a suitable valve-shifting mechanism whereby the bell in its descent actuates the valve, substantially as set forth.

7. In an air-pump, the bell B, provided with suitable depressors $g$ $h$, and the valve L, provided with an actuating shaft or stem, $e$, on which is fixed the rocking arm or lever $f$, the whole combined and arranged in such a manner that the bell in descending will twice shift the valve, substantially as set forth.

8. In an air-pump, the two air-bells, B B, arranged to play up and down independently in a sealing liquid and provided with valved inlets and outlets for the ingress and egress of air, two hydraulic engines arranged to lift the same, two valves arranged to supply water from the mains to the engines, and to permit it to waste away from the engines as the bells descend, and suitable shifting mechanism connected with the bells, whereby one bell, in its descent, shifts the valve connected with the engine of the other bell twice, substantially as set forth.

9. In an air-pump, the bell B, provided with the valves $c'$ and $d'$, one arranged to close the inlet $c$, and the other arranged to close the outlet $d$, substantially as set forth.

10. The combination in an air-pump adapted to serve the double purpose of pump and delivery-reservoir, of two disconnected or flexibly connected, air-bells arranged to be lifted alternately by hydraulic engines, whereby they are filled with air, and to descend by gravity and independently as the air is drawn off, the descending bell shifting twice the valves which control the engine which lifts the other bell, as set forth.

In witness whereof we have hereunto signed our names in the presence of two subscribing witnesses.

AUGUSTUS H. AIKMAN.
GEORGE K. OSBORN.

Witnesses:
HENRY CONNETT,
WALTER W. SCOTT.